United States Patent Office 2,931,804
Patented Apr. 5, 1960

2,931,804
SUBSTITUTED AZIRIDINES

John D. Spivack, Spring Valley, N.Y., assignor to Geigy Chemical Corporation, Ardsley, N.Y., a corporation of Delaware No Drawing. Application July 7, 1958
Serial No. 746,591

6 Claims. (Cl. 260—239)

The present invention relates to a new class of substituted aziridines which correspond to the following formula

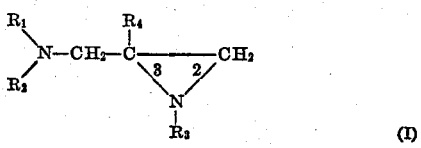

wherein $R_1$, $R_2$ and $R_3$ each represents hydrogen, or a lower alkyl, lower hydroxyalkyl, polyoxyalkylene having two repeating oxyalkylene groups, alkanoyl having from 8 to 18 carbon atoms, benzoyl or benzenesulfonyl groups, and $R_4$ represents hydrogen or a lower alkyl group.

This new class of compounds may be considered as 3-amino-methyl-aziridines since the three membered heterocyclic aziridine ring is conventionally numbered as shown in the above formula. Other names which might be adopted for this class of compounds are 3-aminomethyl-ethyleneimines or C-aminomethyl-ethyleneimines.

It has now been found that the compounds corresponding to this general formula are valuable agents for the animalization of cotton. They are also very interesting new intermediates for further synthesis. The new compounds wherein $R_1$, $R_2$ and $R_3$ represent hydrogen are e.g. very valuable starting materials for the preparation of metal deactivators usable in the stabilization of organic materials in the presence of catalytically active metals, such as copper. The reaction products of 3-aminomethyl-aziridine and salicylaldehyde are, for example, effective as copper deactivators in gasoline.

The new compounds can be readily prepared by adding in a first step a 1,3-diamino-propanol-2 of the general formula

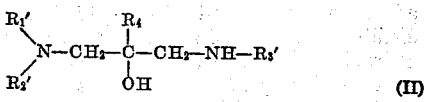

wherein $R_1'$, $R_2'$ and $R_3'$ are hydrogen or lower alkyl and $R_4$ has the meaning given above, to concentrated sulfuric acid, preferably oleum containing 15% $SO_3$, at a temperature substantially below 30° C., preferably at 0–5° C. The reaction mixture is then allowed to stand for some hours and is then heated to below 125° C., preferably to 75–100° C. Upon cooling the sulfuric ester inner salt of the general formula

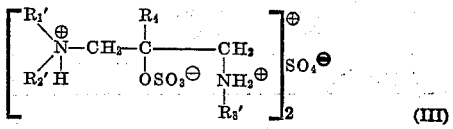

can be isolated. Ring closure of this inner salt to the compound of the general Formula I wherein $R_1$, $R_2$ and $R_3$ are hydrogen or lower alkyl is then effected in a second step in aqueous basic media, using a large excess of a base, such as 50% sodium hydroxide or potassium hydroxide. It is understood that a large excess means e.g. ten moles of a base per one mole of the inner salt. It is essential to add the base very rapidly and to heat the reaction mixture very rapidly (pot temperature 130–300° C., preferably 150–200° C.) to effect fast distillation which is necessary to avoid hydrolysis.

If one of $R_1$, $R_2$ or $R_3$ or if $R_1$, $R_2$ and $R_3$ are hydrogen then other radicals of the definition can be easily introduced by alkylation, benzoylation, benzenesulfonylation, alkanoylation etc. if desired. Depending on the starting material this subsequent introduction of substituents can be a partial introduction.

Instead of a 1,3-diamino-propanol-2 of the general Formula II, there can also be used a 1,2-diamino-propanol-3 of the general formula

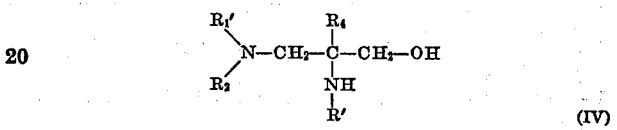

and instead of the sulfuric ester inner salt of the general Formula III there may be used the corresponding bromide or chloride of the formula

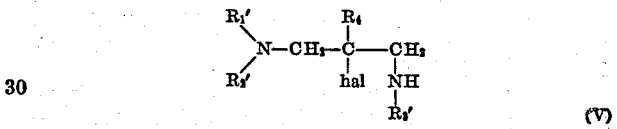

wherein hal represents chlorine or bromine.

The following 1,3-diamino-propanols-2 of the Formula II illustrate e.g. compounds usable as starting materials in the process for the production of the new substituted aziridines according to the present invention:

1,3-diamino-propanol-2,
1,3-diamino-2-methyl-propanol-2,
1,3-diamino-2-ethyl-propanol-2,
1,3-diamino-2-propyl-propanol-2,
1,3-diamino-2-n-butyl-propanol-2,
1,3-diamino-2-amyl-propanol-2,
1,3-diamino-2-hexyl-propanol-2,
1-dimethylamino-3-methylamino-propanol-2,
1-diethylamino-3-ethylamino-propanol-2,
1-dipropylamino-3-propylamino-propanol-2,
1-di-n-butylamino-3-n-butylamino-propanol-2,
1-diamylamino-3-amylamino-propanol-2,
1-dihexylamino-3-hexylamino-propanol-2,
1-dimethylamino-2-methyl-3-methylamino-propanol-2
1-diethylamino-2-ethyl-3-ethylamino-propanol-2,
1-dipropylamino-2-propyl-3-propylamino-propanol-2,
1-di-n-butylamino-2-n-butyl-3-n-butylamino-propanol-2
1-diamylamino-2-amyl-3-amylamino-propanol-2,
1-dihexylamino-2-hexyl-3-hexylamino-propanol-2,
1-dimethylamino-2-methyl-3-amino-propanol-2,
1-diethylamino-2-ethyl-3-amino-propanol-2,
1-dipropylamino-2-propyl-3-amino-propanol-2,
1-di-n-butylamino-2-n-butyl-3-amino-propanol-2,
1-amino-3-methylamino-propanol-2,
1-amino-3-ethylamino-propanol-2,
1-amino-3-propylamino-propanol-2,
1-amino-3-n-butylamino-propanol-2,
1,3-diamino-2-hydroxymethyl-propanol-2,
1,3-diamino-2-hydroxyethyl-propanol-2,
1-dhydroxyethylamino-3-hydroxyethylamino-propanol-2
1-dihydroxyethylamino-2-hydroxyethyl-amino-3-hydroxyethylamino-propanol-2,
1-dihydroxyethylamino - 2 - hydroxyethyl-3-amino-propanol-2,
1-amino-3-hydroxyethylamino-propanol-2, etc.

The following compounds of the Formula IV may be mentioned e.g. as suitable starting materials:

1,2-diamino-propanol-3,
1,2-diamino-2-ethyl-, propyl-, n-butyl-, amyl- and hexyl-propanol-3,
1-diethylamino-2-ethylamino-propanol-3,
1-dipropylamino-2-propylamino-propanol-3,
1-diethylamino-2-ethylamino-2-ethyl-propanol-3,
1-dipropylamino-2-propylamino-2-propyl-propanol-3,
1-dimethylamino-2-amino-2-methyl-propanol-3,
1-diethylamino-2-amino-2-ethyl-propanol-3,
1-dipropylamino-2-amino-2-propyl-propanol-3,
1-amino-2-methylamino-propanol-3,
1-amino-2-ethylamino-propanol-3,
1-amino-2-propylamino-propanol-3,
1,2-diamino-2-hydroxyethyl-, hydroxypropyl-, hydroxybutyl-, hydroxyamyl- and hydroxyhexyl-propanol-3,
1 - dihydroxyethylamino - 2 - hydroxyethylamino - propanol-3,
1-dihydroxypropyl-2-hydroxypropyl-propanol-3,
1 - dihydroxyethylamino - 2-hydroxyethylamino - 2 - hydroxyethyl-propanol-3,
1 - dihydroxyethylamino - 2 - amino - 2 - hydroxyethyl-propanol-3,
1 - dihydroxypropylamino - 2 - amino - 2 - hydroxypropyl-propanol-3,
1-amino-2-hydroxymethylamino-propanol-3,
1-amino-2-hydroxyethylamino-propanol-3,
1-amino-2-hydroxypropylamino-propanol-3, etc.

Substituents other than lower alkyl and lower hydroxyalkyl groups are advantageously introduced into the final 3-aminomethylaziridine.

Thus, the aziridine can be reacted e.g. with an appropriate amount of benzoylchloride or substituted benzoylchloride, preferably lower alkyl benzoylchloride, such as p-methyl-benzoylchloride, p-ethylbenzoylchloride or m-ethyl-benzoylchloride, nitrobenzoylchloride, such as p- or m-nitro-benzoylchloride, 2,4-dinitrobenzoylchloride and chloro- or bromo-benzoylchloride, such as p-chloro-, m-chloro-, p-bromo- or m-bromo-benzoylchloride, in aqueous basic media at temperatures below 50° C., preferably at room temperature, in order to obtain monobenzoylated or dibenzoylated aziridines. The former represents a mixture of 3-benzoylamino-methyl aziridine and 3-amino-methyl-1-benzoyl-aziridine.

In the same manner there can be effected benzenesulfonylation of the 3-aminomethyl-aziridine, whereby not only benzenesulfonylchloride can be used as a reactant but also substituted benzenesulfonylchlorides, preferably p-toluene sulfonylchloride, m-nitrobenzene sulfonylchloride, 2,4-dinitrobenzenesulfonylchloride, p- or m-chlorobenzene sulfonylchloride and p- or m-bromobenzenesulfonylchloride.

Alkanoylation is easily obtained by reacting the 3-aminomethyl aziridine with alkanoylchlorides, such as lauroylchloride, stearylchloride, caproylchloride, pelargonylchloride, undecanoylchloride, and the like. Alkanoyl groups having from 8 to 18 carbon atoms are the preferred groups.

Here again monobenzene sulfonylation yields mixtures of 3-benzenesulfonylaminomethyl aziridine and 3-aminomethyl-1-benzenesulfonyl aziridine. The reaction of one mole of 3-aminomethyl aziridine and one mole of ethylene oxide yields mixtures of 3-aminomethyl-1-hydroxyethyl aziridine and 3-hydroxyethylaminomethyl aziridine. As described above, hydroxyethyl substituted aziridines can be prepared, however, directly from the correspondingly substituted 1,3-diamino-propanol-2 or 1,2-diamino-propanol-3. The reaction of one mole of 3-aminomethyl aziridine and four moles of ethylene oxide yields N,N, N'-tri-polyoxyethylene substituted 3-aminomethyl aziridines with a total of four oxyethylene groups. These aziridines are the preferred polyoxyethylene substituted aziridines which in turn are the preferred polyoxyalkylene substituted aziridines, according to the present invention. The content of oxyethylene groups can easily be increased by reacting the aziridines with larger amounts of ethylene oxide, or by reacting them with preformed polyoxyethylene glycols.

3-aminomethyl aziridine and its reaction products, e.g. of four moles of ethylene oxide and one mole of 3-aminomethyl aziridine, polymerize in the presence of strong acids, such as concentrated hydrochloric acid and other acids, if the acid is added to the aziridine at room temperature or substantially below room temperature and if the acid mixture is then heated for some time to about 70–90° C. or up to about 180° C. under atmospheric pressure.

The following examples, which represent the presently preferred embodiment of the invention, illustrate the invention without limiting it in any way. Where not otherwise stated, parts are given as parts by weight and the temperatures are given in degrees centigrade. The relationship of parts by weight to parts by volume is as that of kilogrammes to litres.

*Example 1.—3-aminomethyl-aziridine*

134 parts of 1,3-diaminopropanol-2 (1.49 moles) are added to 862 parts of sulfuric acid, containing 15% free $SO_3$, over a period of 2.5 hours, the reaction temperature being maintained at 5 to 10°. The reaction mixture is allowed to stand overnight at room temperature whereupon it is heated for two hours at 75°. It is then poured onto 1100 parts of chopped ice. The product crystallizes immediately and is vacuum filtered. The filter cake is washed successively with 1000 parts of 50% by volume of aqueous isopropanol, 300 parts of isopropanol and 300 parts of acetone. The slightly moist solid cake weighs 400 parts and upon analysis is shown to consist of 71.6% of the inner salt bis-(1,3-diaminopropyl sulfuric acid)-sulfate having the structure

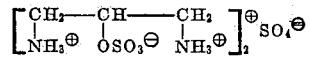

The yield is 87% of the theory. Upon drying for 15 hours under vacuum at 70°, the product weighs 289 parts and is 89% pure. 450 parts of bis-(1,3-diaminopropyl-sulfuric acid)-sulfate (89.0%, 0.92 mole) are dissolved in 100 parts by volume of water and 840 parts of 50% aqueous sodium hydroxide are then added rapidly. The reaction mixture is heated rapidly to effect distillation and the distillate is collected and cooled in a receptacle immersed in an ice-water bath. The initial foaming of the reaction mixture subsides and smooth distillation occurs, the vapor temperature being in the range of 104 to 121°. To 415 parts by volume of the distillate is added 600 parts of potassium hydroxide pellets and 44.7 parts of an organic layer are separated. An additional 100 parts of 50% aqueous sodium hydroxide are added to the pot and 125 parts by volume of liquid is distilled at 127 to 134°. About 100 parts of potassium hydroxide are added and an upper organic layer is separated weighing 35 parts. The combined organic layer (79.7 parts) is dried twice over potassium hydroxide pellets, the separated water being removed. The organic layer is then distilled over potassium hydroxide pellets; the colourless liquid distillate boils at 54 to 56° under 11 mm. Hg pressure. The yield of 3-aminomethyl aziridine obtained is about 56.5 parts or 42.7% of the theory.

The compound corresponds to the formula

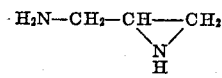

Analysis:

| | Calculated | Found |
|---|---|---|
| Total amine equivalent weight | 36.0 | 35.3 |
| Primary amine equivalent weight | 72.0 | 72.8 |

A portion of the product was redistilled, boiling at 60° under 12 mm. Hg pressure.

Analysis for $C_3H_8N_2$: Calculated, percent N 38.88. Found, percent N 38.64.

If instead of the 134 parts of 1,3-diaminopropanol-2, 197 parts of 1-dimethylamino-3-methylamino-propanol-2, or 259 parts of 1-diethylamino-3-ethylamino-propanol-2, or 321 parts of 1-di-n-propylamino-3-propylamino-propanol-2 are used, and otherwise the same procedure is followed, then 3-dimethylamino-methyl-1-methyl aziridine, 3-diethylaminomethyl-1-ethyl aziridine and 3-di-n-propylaminomethyl-1-n-propyl aziridine is obtained.

*Example II.—3-aminomethyl-3-methyl aziridine*

66 parts of 1,3-diamino-2-methyl-propanol-2 (94%; 0.6 mole) are added dropwise to 396 parts of oleum (15% $SO_3$) at 0 to 5° over a period of about 30 minutes. After the addition is complete the reaction mixture is heated at 75 to 80° for 2 hours. The reaction mixture is cooled to room temperature and poured into 900 parts by volume of dioxane cooled to about 12° and additional cooling is provided by an ice-water bath. 900 parts of isopropanol are added and the white precipitate is filtered off by suction. The filter cake is saturated with 500 parts by volume of isopropanol and is then dried in a vacuum dessicator, over phosphorus pentoxide. The white powder weighs 117 parts. The analysis shows that it consists of about 80.6% of the inner salt bis-(1,3-diaminopropyl sulfuric acid-2)-sulfate having the structure

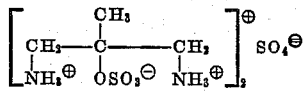

The yield is 68% of the theory.

117 parts bis-(1,3-diaminopropyl sulfuric acid-2)-sulfate (80.6%, 0.207 mole) are slurried in 400 parts by volume of water and 70 parts of sodium hydroxide pellets are dissolved in the slurry with cooling. This aqueous solution is added dropwise to 100 parts of 50% aqueous sodium hydroxide, heated to a temperature of 250°. During the ensuing distillation an attempt is made to collect the distillate at the same rate as the aqueous solution of sulfuric ester is added; the pot temperature being 150° and the vapor temperature 105°. 500 parts of distillate are collected in this way and 400 parts of sodium hydroxide pellets are added cautiously with cooling. The separated upper organic layer is taken up in three 200 parts by volume portions of ether which are then dried over anhydrous calcium oxide. The ether is then evaporated and 10 parts of residue are thus obtained, indicating a crude yield of 29% of the theory. The 3-amino-3-methyl aziridine is purified by distillation.

It corresponds to the formula

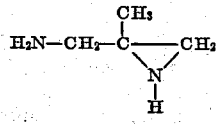

and boils at 53–54° under 10 mm. Hg pressure.

Analysis for $C_4H_{10}N_2$ (basic nitrogen equivalent weight): Calculated, 43.0. Found, 44.8.

If instead of the 66 parts of 1,3-diamino-2-methyl-propanol-2 (94%) 71 parts of 1,3-diamino-2-ethyl-propanol-2, 79 parts of 1,3-diamino-2-n-propyl-propanol-2, 87 parts of 1,3-diamino-2-n-butyl-propanol-2 or 94 parts of 1,3-diamino-2-n-amyl-propanol-2 are used (all substantially pure compounds), and otherwise the same procedure is followed, then 3-aminomethyl-3-ethyl aziridine, 3-aminomethyl-3-n-propyl aziridine, 3-aminomethyl-3-n-butyl aziridine and 3-aminomethyl-3-n-amyl aziridine is obtained.

*Example III.—Monobenzoylation of 3-aminomethyl aziridine*

7.2 parts of 3-aminomethyl aziridine (0.10 mole) are dissolved in 100 parts by volume of methanol containing 2 parts of sodium hydroxide and 4 parts of water. The alkaline mixture is then cooled while stirring to 5°. 7.1 parts of benzoylchloride (0.05 mole) are added dropwise over a period of 15 to 20 minutes at about 5° and the reaction mixture is then stirred for several hours at 10 to 15°. The solution is filtered free from precipitated salt and concentrated to a viscous oil by distillation at 15 mm. Hg pressure and finally in a water bath at 50 to 70° at 0.5 mm. Hg pressure to remove excess 3-amino-methyl aziridine and solvent.

The monobenzoylated product which consists of a mixture of the two compounds

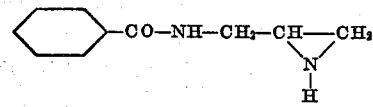

and

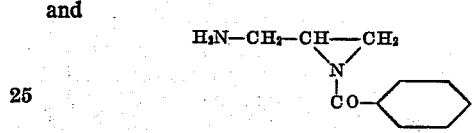

has the following analysis (moisture free basis) for $C_{10}H_{12}ON_2$:

|  | Percent C | Percent H |
| --- | --- | --- |
| calculated | 68.18 | 6.81 |
| found | 68.55 | 6.81 |

The analysis shows the presence of one equivalent of base per mole of monobenzoylated product as required by theory.

*Example IV.—Dibenzoylation of 3-aminomethyl aziridine*

3.6 parts of 3-aminomethyl aziridine (0.05 mole) are dissolved in 100 parts by volume of 50% aqueous acetone containing 4 parts of sodium hydroxide dissolved therein. 14.1 parts of benzoylchloride are added dropwise over a period of 10 minutes. The reaction mixture is then left standing for 16 hours after which time it is extracted with ether. The ether extract is dried over anhydrous sodium sulfate. The ether is then evaporated and the residue (12.2 parts) is crystallized from benzene. The white crystals of 3-benzoylaminomethyl-1-benzoyl aziridine melt at 134 to 135°.

Analysis for $C_{17}H_{16}O_2N_2$:

|  | Percent C | Percent H | Percent N |
| --- | --- | --- | --- |
| calculated | 72.85 | 5.71 | 10.00 |
| found | 72.76 | 5.57 | 10.04 |

*Example V.—N,N'-di-p-nitrobenzoyl-3-amino-methyl aziridine*

An etheral solution of 2.55 parts of p-nitrobenzoyl chloride (0.014 mole) in 50 parts by volume of anhydrous ether is added over a period of twenty minutes to 1 part of 3-amino-methyl aziridine and 1.4 parts of triethylamine dissolved in 50 parts by volume of anhydrous ether. A precipitate is formed which is filtered off and washed with water. After drying in vacuo the precipitate is recrystallized from a mixture of acetone and benzene (1:1). The product which corresponds to the formula

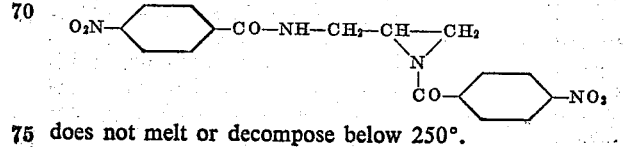

does not melt or decompose below 250°.

Analysis for $C_{17}H_{14}O_6N_4$:

| | Percent N |
|---|---|
| Calculated | 15.13 |
| Found | 15.29 |

If instead of the 2.55 parts of p-nitrobenzoyl chloride 2.14 parts of p-methylbenzoyl chloride, 2.31 parts of p- or m-ethylbenzoyl chloride, 3.15 parts of 2,4-dinitrobenzoyl chloride, 2.40 parts of p-chlorobenzoyl chloride or 3.02 parts of m-bromobenzoyl chloride are used, and otherwise the same procedure is followed, then 3-(p-methyl-benzoyl)-aminomethyl-1-(p-methyl-benzoyl)-aziridine, 3-(p-ethylbenzoyl)-aminomethyl-1-(p-ethyl-benzoyl-)-aziridine, 3-(m-ethylbenzoyl)-aminomethyl-1-(m-ethyl-benzoyl)-aziridine, 3-(2,4-dinitrobenzoyl)-aminomethyl-1-(2,4-di-nitrobenzoyl)-aziridine, 3-(p-chlorobenzoyl)-aminomethyl-1-p-(chlorobenzoyl)-aziridine or 3-(m-bromobenzoyl)-aminomethyl-1-(m-bromobenzoyl)-aziridine is correspondingly obtained.

*Example VI.—Dibenzenesulfonylation of 3-amino-methyl aziridine*

3.6 parts of 3-aminomethyl aziridine (0.05 mole) are dissolved in 100 parts by volume of 50% aqueous acetone containing 4 parts of sodium hydroxide dissolved therein, the alkaline reaction mixture being cooled to about 0°. 17.6 parts of benzenesulfonyl chloride (0.10 mole) are then added dropwise over a period of 20 minutes at 5 to 10°. The reaction mixture is allowed to stand for 1½ hours and the precipitated white solid is then filtered off (9 parts). After recrystallization from benzene, the product which corresponds to the formula

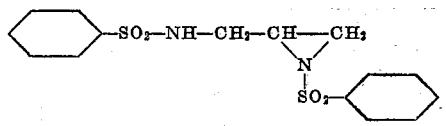

melts at 97 to 98°.

Analysis for $C_{15}H_{16}O_4N_2S_2$:

| | Percent C | Percent H | Percent N |
|---|---|---|---|
| calculated | 51.36 | 4.57 | 7.95 |
| found | 51.42 | 4.48 | 8.23 |

The residues are concentrated to dryness and recrystallized from xylene three times. The product thus obtained melts at 108 to 109° and appears to be an isomer of the product melting at 97 to 98° because it shows a depression of the melting point on admixture with the latter mentioned compound. Its analysis shows essentially the same results.

| | Percent C | Percent H | Percent N |
|---|---|---|---|
| calculated | 51.36 | 4.57 | 7.95 |
| found | 51.26 | 4.73 | 8.17 |

If instead of the 17.6 parts of benzenesulfonylchloride 19 parts of p-toluene sulfonylchloride, 22.1 parts of m-nitrobenzene sulfonylchloride, 26.3 parts of 2,4-dinitrobenzene sulfonylchloride, 21.1 parts of p-chlorobenzene sulfonylchloride or 25.5 parts of m-bromobenzene sulfonylchloride are used, and otherwise the same procedure is followed, then 3-(p-toluene-sulfonyl)-amino-methyl-1-p-toluene-sulfonyl-aziridine, 3-(m-nitrobenzene-sulfonyl)-aminomethyl-1-m-nitro-benzene-sulfonyl aziridine, 3-(2,4 - dinitrobenzene - sulfonyl) - aminomethyl - 1 - (2,4-dinitrobenzene-sulfonyl)-aziridine, 3-(p-chlorobenzene-sulfonyl)-aminomethyl-1-p-chlorobenzene-sulfonyl aziridine or 3-(m-bromobenzene-sulfonyl)-aminomethyl-1-m-bromobenzene-sulfonyl aziridine is correspondingly obtained.

*Example VII.—3-dodecanamidomethyl-1-dodecanoyl aziridine*

21.9 parts of lauroyl chloride (0.10 mole) are added dropwise at 15 to 25° to an anhydrous benzene solution of 7.2 parts of 3-aminomethyl aziridine (0.10 mole) and 10.1 parts of triethylamine (0.10 mole) dissolved in 100 parts by volume of benzene. A white solid precipitates after a while, rendering the reaction mixture so viscous that an additional 100 parts by volume of benzene are added to ensure efficient agitation. The benzene is then removed by distillation at reduced pressure and the residue is crystallized twice from hexane yielded white crystals which melt at 84 to 85°. The product corresponds to the formula

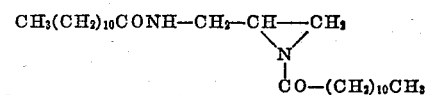

Analysis for $C_{27}H_{52}O_2N_2$:

| | Percent C | Percent H | Percent N |
|---|---|---|---|
| calculated | 74.31 | 11.92 | 6.42 |
| found | 73.93 | 12.02 | 6.49 |

If instead of the 21.9 parts of lauroyl chloride 30.3 parts of stearyl chloride are used, and otherwise the same procedure is followed, then 3-octadecanoylaminomethyl-1-octadecanoyl aziridine is obtained.

*Example VIII.—Reaction product of 1 mole of ethylene oxide and 1 mole of 3-aminomethyl aziridine*

Ethylene oxide is added at 77 to 83° in gaseous form to 14 parts of 3-aminomethyl aziridine (0.20 mole) dissolved in 100 parts by volume of dry dioxane over a period of 3½ hours. The hydroxyalkylated product is isolated by distilling off the dioxane at 101° under atmospheric pressure and by distilling off the unreacted 3-amino-methyl aziridine (4.37 parts) at 59 to 60° under 12 mm. Hg pressure through a Vigreux type fractionating column. The analysis shows that the residual light oil is the addition product of one mole of ethylene oxide and one mole of 3-amino-methyl aziridine, and that the ethylene oxide added primarily to the imino nitrogen atom although not exclusively so. The reaction product may, therefore, be represented as a mixture of

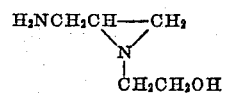

and

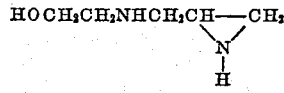

*Example IX.—Reaction product of 4 moles of ethylene oxide and 1 mole of 3-aminomethyl aziridine*

Ethylene oxide is added at 40 to 45° in gaseous form to a solution of 36 parts of 3-aminomethyl aziridine (0.50 mole) dissolved in 100 parts by volume of dry dioxane over a period of ten hours. After removal of the dioxane and the unreacted 3-amino-methyl aziridine by distillation at 12 mm. Hg, analysis of the residual oil (115.4 parts) shows that it is the reaction product of four moles of ethylene oxide and 1 mole of 3-aminomethyl aziridine. The analysis shows further that there are no primary amino groups present in the product. The product, therefore, can be represented by the following structural formula:

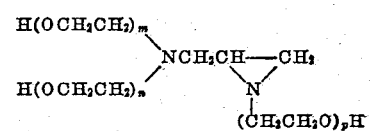

wherein $m+n+p=4$.

Example X.—Animalization of cotton 5 parts of bleached unfinished cotton sheeting are thoroughly impregnated with 5 parts of 3-aminomethyl aziridine and heated for 5½ hours at 150 to 160° in a small glass lined autoclave. The treated fabric is allowed to cool to room temperature and is then thoroughly rinsed with distilled water until the washings are no longer basic to pH-paper. The fabric is then dried at 50°. The final weight of the treated cotton is 5.4 parts. The nitrogen content of the animalized cotton is found to be 2.9% indicating the presence of about 1 mole of 3-amino-methyl aziridine (or its reaction products) per 8 moles of anhydroglucose units. The treated cotton fabric is more resilient and elastic when compared with the untreated cotton. The animalized cotton is then treated with various acid dyes as follows:

2 parts of the animalized cotton are dyed at the boil for half an hour with a 1% aqueous solution of the acid dyestuff Polar Brilliant Blue RAW (new C.I. 61585, Acid Blue 80). Whereas the untreated bleached cotton sheeting were not dyed to any appreciable extent, the animalized cotton showed good exhaustion and dyeing properties. The dyeing experiments with Polar Brilliant Blue RAW (new C.I. 61135, Acid Blue 127) and Erio Fast Cyanine S (new C.I. 63010, Acid Blue 45) give similar results. The animalized cotton shows in each case excellent dyeing characteristics to these dyestuffs, whereas the untreated bleached cotton is not dyed to any appreciable extent.

Instead of the 3-aminomethyl aziridine any aziridine of the Examples II to IX inclusive can be used with similar excellent results.

What I claim is:

1. A substituted aziridine having the general formula:

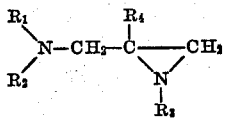

wherein $R_1$, $R_2$ and $R_3$ each represents a member selected from the group consisting of hydrogen, lower alkyl, lower hydroxyalkyl, polyoxyethylene groups with two repeating oxyethylene groups, alkanoyl groups with from 8 to 18 carbon atoms, benzoyl, lower alkylbenzoyl, nitrobenzoyl, chlorobenzoyl, bromobenzoyl, benzenesulfonyl, lower alkylbenzenesulfonyl, nitrobenzenesulfonyl, chlorobenzenesulfonyl and bromobenzenesulfonyl groups, and $R_4$ represents a member selected from the group consisting of hydrogen and lower alkyl groups.

2. The compound of the formula:

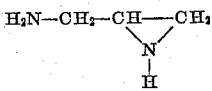

3. The compound of the formula:

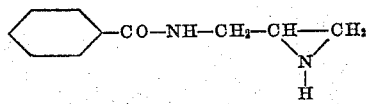

4. The compound of the formula:

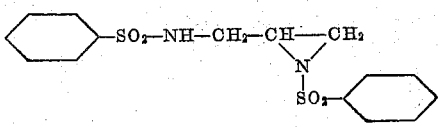

5. The compound of the formula:

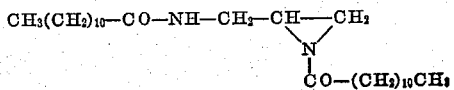

6. A compound of the formula:

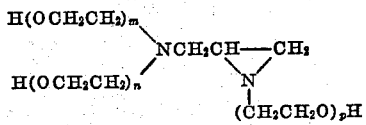

wherein $m+n+p$ is equal to 4, and each of $m$, $n$, and $p$ is a whole number from 1 to 2 inclusive.

References Cited in the file of this patent

FOREIGN PATENTS 678,103     Great Britain _____ Aug. 27, 1952